Dec. 8, 1936.  W. STECKLEY ET AL  2,063,204
TRACTOR GUIDE
Filed Sept. 10, 1935  2 Sheets-Sheet 1
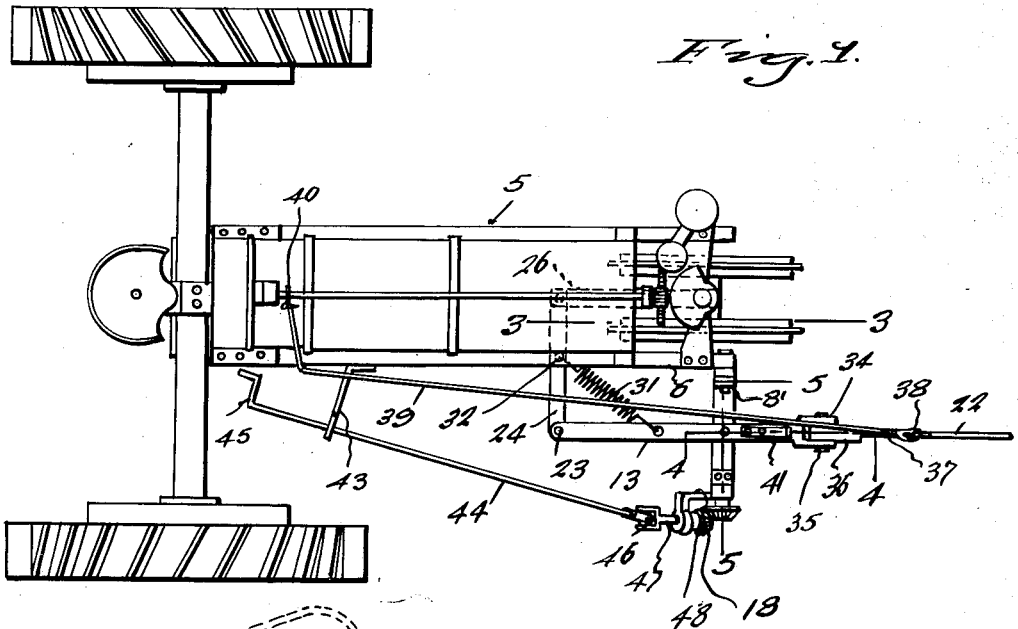
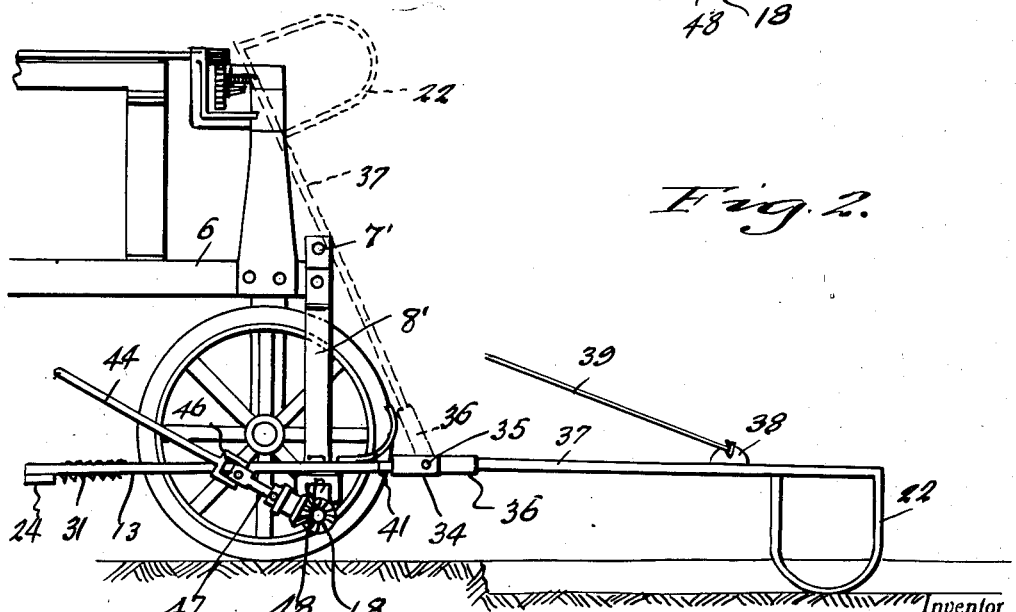
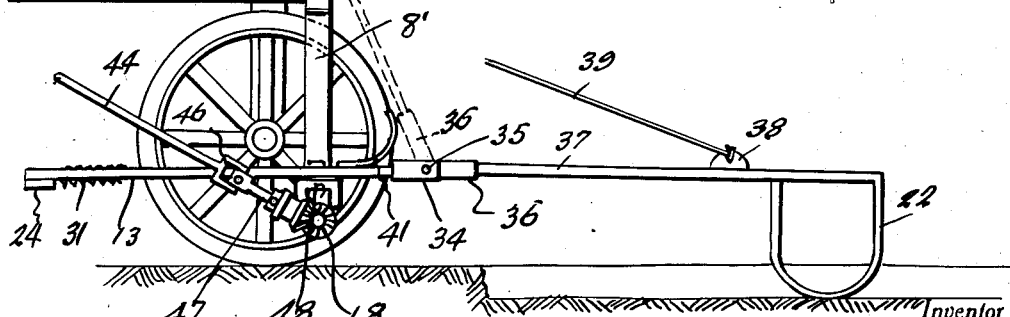
Inventor
William Steckley
J. F. Steckley
By Clarence A. O'Brien
Attorney Patented Dec. 8, 1936

2,063,204

UNITED STATES PATENT OFFICE 2,063,204

TRACTOR GUIDE

William Steckley and Joseph F. Steckley, Geddes, S. Dak.

Application September 10, 1935, Serial No. 39,962

5 Claims. (Cl. 97—49)

Our invention relates generally to means for guiding a vehicle relative to formations of the ground over which the same is traveling, and particularly to a guide for mounting on a tractor to enable guiding the tractor relative to a selected row on the field, and an important object of our invention is to provide an efficient, rugged and easily operated device of this kind.

Another important object of our invention is to provide a device of the character indicated above which is capable of being quickly and easily installed on the tractor, and which can be adjusted so as to be completely out-of-the-way when not in use.

Other important objects of our invention will be apparent from a reading of the following description in connection with the drawings, wherein for purposes of illustration we have shown a preferred embodiment of our invention.

In the drawings:—

Figure 1 is a top plan view showing a tractor having one embodiment of the invention mounted thereon.

Figure 2 is a side elevational view showing the guide in operative position as in Figure 1.

Figure 3 is a longitudinal sectional view through the forward part of the tractor approximately 3—3 of Figure 1 and showing a support bracket attached to the front axle of the tractor.

Figure 4 is a longitudinal sectional view taken through Figure 1 approximately on the line 4—4.

Figure 5 is a transverse vertical sectional view taken through Figure 1 approximately on the line 5—5.

Figure 6 is a perspective view of the mounting bracket.

Figure 7 is a perspective view of the side bracket.

Figure 8 is a perspective view of the outer end of the guide arm.

Figure 9 is a plan view of an alternative arrangement for operating the guide arm in lateral directions.

Figure 10 is a top plan view of an alternative arrangement for operating the guide arm in vertical directions.

Figure 11 is a side elevational view of an alternative arrangement of manual means for operating the guide arm into and out of its retracted and extended positions.

Referring in detail to the drawings, and particularly to the form of the invention shown in Figures 1, 2, 3 and 4, the numeral 5 generally designates the tractor having the side member 6 to the front end of which is usually attached the cultivator and the like. In accordance with the present invention the upper end of an upright 7, is bolted as indicated at 7' to the said part of the side member of the tractor and this has an outwardly declining bracket 8 which terminates in a horizontal part 9 which forms the slide for the slide guide 10 which is a rectangular block as shown in Figure 7 having an opening 11 therethrough to receive the slide 9. The threaded stud 12 rising from the top of the guide 10 is arranged to act as a pivot for the guide arm support 13 which is held in place thereon by a nut 14. A diagonal brace 8' is connected between the vertical and horizontal portions of the upright 7.

Brackets 15 and 16 have portions depending from the slide 9 at opposite ends thereof to rotatably receive the screw 17 which has fixed thereto at one end the beveled gear 18 which has a portion bearing against the outer side of the bracket 16 and at its inner end a retaining collar 19 which bears against the inner side of the bracket 15. A lug 20 depending from the slide guide 10 has a threaded opening 21 receiving the screw 17 so that rotation of the screw 17 causes movement of the slide guide 10 inwardly and outwardly with respect to the side of the tractor so as to correspondingly swing the guide arm support 13 so as to position the guide arm 22 thereon relative to the row which the tractor is to follow.

The rear end of the guide arm support 13 is pivoted as indicated at 23 to the outer end of a horizontal support arm 24 which is bolted as indicated at 25 to the rear end of the support bracket 26 which has near its front end an L-shaped brace 27 which is arranged to engage the rear side of the tractor axle 28 as shown in Figure 3. A bolt hole 29 in front of the member 27 accommodates the bolt 30 which threads into the axle to attach the bracket thereto, in such a way as to rigidly connect the axle, the member 27 and the bracket 26.

A spring 31 which is stretched between a fastener 32 on the support arm 24 and to an intermediate part of the guide arm support 13 keeps the guide arm support 13 normally urged in an inward direction and makes a non-rattling engagement of the parts.

The front end of the guide arm support 13 is bifurcated as indicated at 34 and the bifurcations are traversed by a pivot 35 which traverses the enlarged rear end portion 36 of the guide arm 37 which has a depending loop 22 already alluded to for engaging the ground. An intermediate part of the rod 37 has attached thereto as indicated at 38 the forward end of the operating rope 39 which is connected to a convenient place near the seat of the operator of the tractor as generally indicated by the numeral 40. An upwardly and forwardly curved spring 41 is attached to the top of the guide arm support just behind the bifurcated portion 34 and in such a position that the spring will engage the enlarged portion 36 of the guide arm 37 while the guide arm is in a retracted position such as that shown in dotted lines in Figure 2, such a position of the guide arm having been given thereto by jerking rearwardly on the rope 39. While the guide arm is in the retracted position shown a slight rearward jerk followed by a releasing of the rope will cause the spring 41 to throw the guide arm forwardly into the operative position shown in full lines in Figure 2.

A bracket 43 extending laterally from the frame side member 6 of the tractor has journalled therein the rear part of the rotary operating rod 44 which has an operating crank 45 on its rear end and at its forward end connects with a universal joint 46 which, in turn, is connected to a shaft 47 journaled in a bracket 48 which extends from the bracket 16. The shaft 47 has on its depressed end the beveled gear 48 which is meshed with the beveled gear 18. It is obvious that by rotating the operating rod 44 in the desired direction, inward and outward sliding movement of the guide support 13 may be achieved to the desired degree through the action of the screw 17 on the slide guide 10.

An alternative form of the invention comprises all of the parts described above except that the screw 17 and the beveled pinions 18 and 48 have substituted therefor the worm 50 and the segmental gear 51, the segmental gear having an ear 52 operatively connected to the guide arm and the gear itself being pivoted as indicated at 53 on the horizontal part 9' of a corresponding support member 8'.

An alternative construction of the guide arm (shown in Figure 10) contemplates the presence on the support arm 13a of a rigid cross arm 55 and on the guide arm 37a of a rigid cross arm 56, and of springs 57 and 58 which are stretched between the adjacent ends of the cross arms. The purpose of these springs is to help raise the guide arm into its elevated retracted position; and to depress and hold down the guide arm below its dead center operative position provided by the pivot 35a and so as to more firmly engage it with the ground.

If desired, the guide arm positioning rope 39 may be replaced by a relatively rigid positioning rod 39a having a handle 59 at its rear end as shown in Figure 11 and having its front end pivotally connected to a rigid bracket 38a mounted on the guide arm 37a. This arrangement provides efficient means for controllably and easily bringing the guide arm up out of operative position and pushing the same ahead into operative position.

Although we have shown and described herein preferred embodiments of our invention, it is to be definitely understood that we do not desire to limit the application of the invention thereto, and any change or changes may be made in the materials, and in the structure and arrangement of the parts, within the spirit of the invention and the scope of the subjoined claims.

What is claimed is:—

1. A device of the character described comprising a bracket adapted for mounting on a tractor having steering mechanism, a slide on said bracket, a guide arm, means pivoting said guide arm on said slide, and gear means having control means within reach of the operator of the tractor, said gear means being operatively connected to said slide for swinging said guide arm inwardly and outwardly with respect to the side of the tractor.

2. A device of the character described comprising a bracket adapted for mounting on a tractor having steering mechanism, a slide on said bracket, a guide arm, means pivoting said guide arm on said slide, and gear means having control means within reach of the operator of the tractor and operatively connected to said slide for swinging said guide arm inwardly and outwardly with respect to the side of the tractor, said guide arm having an element connected to said steering mechanism whereby said guide arm is made to swing on its pivot in the same direction as the steering mechanism is steered.

3. A device of the character described comprising a bracket adapted for mounting on a tractor, a guide arm pivoted on said bracket, and gear means having operating means within the control of the operator of the tractor, said gear means being operatively connected to said guide arm for swinging said guide arm inwardly and outwardly with respect to the side of the tractor, said guide arm having a ground engaging element pivoted for movement in a vertical plane, said ground engaging element having operating means extending to within reach of the operator of the tractor for swinging said element out of a depressed ground engaging position, and helper spring means with which said element is adapted to engage for helping said element into and out of depressed operative position.

4. A device of the character described comprising a bracket adapted for mounting on a tractor, a guide arm, means pivotally and slidably mounting said guide arm on said bracket, and gear means including an operating member within reach of the operator of the tractor, said gear means being operatively connected to said means for swinging said guide arm inwardly and outwardly with respect to the side of the tractor, said gear means including two meshed pinions and a screw operated by one of the pinions.

5. A device of the character described comprising a bracket adapted for mounting on a tractor, a guide arm, means pivotally and slidably mounting said guide arm on said bracket, and gear means including an operating member within reach of the operator of the tractor, said operating member being operatively connected to said means for swinging said guide arm inwardly and outwardly with respect to the side of the tractor, said gear means including a toothed segment and a worm meshed therewith.

WILLIAM STECKLEY.
JOE F. STECKLEY.